United States Patent [19]
Dunton et al.

[11] Patent Number: 5,395,442
[45] Date of Patent: Mar. 7, 1995

[54] LIGHTWEIGHT CONCRETE ROOF TILES

[75] Inventors: Harvey R. Dunton, Anaheim; Francis C. Petersen, Mission Viejo, both of Calif.

[73] Assignee: Boral Concrete Products, Inc., Ontario, Calif.

[21] Appl. No.: 48,033

[22] Filed: Apr. 14, 1993

[51] Int. Cl.$^6$ ............................................. C04B 14/00
[52] U.S. Cl. ....................... 106/724; 106/681; 106/694; 106/696; 106/718; 106/803; 106/811; 106/823; 524/2; 524/650
[58] Field of Search ............... 106/713, 724, 718, 719, 106/811, 819, 823, 681, 694, 696, 803

[56] References Cited

U.S. PATENT DOCUMENTS

| | | | |
|---|---|---|---|
| 2,598,981 | 6/1952 | Denning | 106/86 |
| 3,650,784 | 3/1972 | Albert et al. | 106/90 |
| 3,841,885 | 10/1974 | Jakel | 106/95 |
| 3,845,593 | 11/1974 | Zen | 52/336 |
| 3,852,083 | 12/1974 | Yang | 106/111 |
| 3,852,934 | 12/1974 | Kirkhuff | 52/539 |
| 3,870,777 | 3/1975 | Jakel | 264/71 |
| 3,923,717 | 12/1975 | Lalk et al. | 260/29.65 |
| 3,925,090 | 12/1975 | Head | 106/87 |
| 3,954,480 | 5/1976 | Inderwick | 106/90 |
| 3,955,992 | 5/1976 | Roberts | 106/90 |
| 3,972,969 | 8/1976 | Rio et al. | 264/42 |
| 3,980,484 | 9/1976 | Shaw | 106/90 |
| 3,988,279 | 10/1976 | Klassen | 260/29.2 EP |
| 4,043,826 | 8/1977 | Hum | 106/90 |
| 4,077,809 | 3/1978 | Plunguian et al. | 106/88 |
| 4,088,808 | 5/1978 | Cornwell et al. | 428/409 |
| 4,152,168 | 5/1979 | Yano et al. | 106/99 |
| 4,159,302 | 6/1979 | Greve et al. | 264/333 |
| 4,288,959 | 9/1981 | Murdock | 52/518 |
| 4,420,525 | 12/1983 | Parks | 428/156 |
| 4,473,406 | 9/1984 | Bradley et al. | 106/90 |
| 4,501,830 | 2/1985 | Miller et al. | 523/401 |
| 4,559,263 | 12/1985 | Roodvoets | 428/312.4 |
| 4,594,210 | 6/1986 | Vittone et al. | 264/70 |
| 4,673,659 | 6/1987 | Wood et al. | 106/98 |
| 4,676,832 | 6/1987 | Childs et al. | 106/90 |
| 4,703,801 | 11/1987 | Fry et al. | 166/293 |
| 4,746,365 | 5/1988 | Babcock et al. | 106/695 |
| 4,767,460 | 8/1988 | Parcevaux et al. | 106/90 |
| 4,778,527 | 10/1988 | Ikunaga et al. | 106/87 |
| 4,956,013 | 9/1990 | Motoki | 106/675 |
| 5,049,288 | 9/1991 | Brothers et al. | 252/8.551 |
| 5,069,721 | 12/1991 | Tamura et al. | 106/724 |
| 5,075,358 | 12/1991 | Riley et al. | 524/5 |
| 5,092,935 | 3/1992 | Crema et al. | 106/808 |
| 5,098,504 | 3/1992 | Motoki | 156/305 |
| 5,106,557 | 4/1992 | Rirsch et al. | 264/118 |
| 5,108,679 | 4/1992 | Rirsch et al. | 264/118 |
| 5,116,420 | 5/1992 | Schneider | 106/640 |
| 5,135,577 | 8/1992 | Brothers | 106/724 |
| 5,169,573 | 12/1992 | Tsuchida et al. | 264/35 |
| 5,185,389 | 2/1993 | Victor | 524/2 |

FOREIGN PATENT DOCUMENTS

| | | |
|---|---|---|
| 2526014 | 11/1983 | France. |
| 2351469 | 4/1975 | Germany. |
| 34819 | 3/1978 | Japan. |
| 42271 | 3/1980 | Japan. |

*Primary Examiner*—Karl Group
*Assistant Examiner*—Michnel Marcheschi
*Attorney, Agent, or Firm*—Robbins, Berliner & Carson

[57] ABSTRACT

Lightweight concrete roof tiles are produced by extruding a latex/cement/lightweight aggregates/water mix in a prescribed sequence. The composition comprises:

(a) 45–65 parts by weight of an acrylic latex emulsion;

(b) 130–180 parts by weight of a cement;

(c) 360–400 parts by weight of expanded shale lightweight aggregates; and (d) 50–75 parts by weight of additional water.

This lightweight concrete roof tile of the present invention is about half the weight and about the same strength, and absorbs the same amount of water of conventional roof tiles.

13 Claims, 1 Drawing Sheet

LIGHTWEIGHT CONCRETE ROOF TILES

BACKGROUND OF THE INVENTION

1. Technical Field

This invention relates to compositions and methods useful for production of lightweight concrete roof tiles and more particularly, concerns the use of latex in admixture capable to produce such roof tiles. The lightweight concrete roof tiles thus produced, meet the Uniform Building Code Standard (UBCS) No. 32-12 for lightweight concrete roof tiles and is useful as a replacement for wood shingles and shakes, asphalt shingles, asbestos cement roofing, slates, etc.

As used herein, the term "lightweight concrete roof tile(s)" means a concrete roof tile with a specific gravity of about 1.06 to 1.38. Thus, for a lightweight concrete roof tile of conventional dimensions with a volume of about 2.163 liters, it will weigh about 2.727 kg.

As used herein, the term "strength test" means the strength test conducted according to UBCS No. 32-12, §32.1206 test procedure. First, a total of ten representative samples are selected from the lightweight concrete roof tiles production. The samples are then conditioned at a temperature of 73°±5° F. and 50% relative humidity for a period of twenty-eight days. At the end of the conditioning period, the weight for each specimen is recorded.

Five samples conditioned as above are subjected to the strength test.

The sample is tested as shown in FIG. 1 with the load applied at a uniform rate not exceeding ten pounds per second until failure. The breaking load is recorded to the nearest pound. The test is repeated three times and the average breaking load is determined.

For the tiles of the present invention, the average breaking load shall not be less than 300 pounds for five consecutive test samples or 250 pounds for any individual sample for the tiles to have passed the strength test.

As used herein, the term "water absorption test" means the water absorption test conducted according to the UBCS No. 32-12, §32.1206(b) test procedure.

A minimum of five samples from the tile fractured in the strength test are tested for water absorption. The sum of the dry weight for five samples at room temperature are more than 12 pounds. A total of five or more samples of the ridge and other accessory tile not subjected to the strength test are also tested. Their aggregate dry weight at room temperature of these samples are to be more than five pounds.

Loose particles are removed by scrubbing with a fiber brush and clean water. Samples are dried in a well-ventilated oven for twenty-four hours at a temperature of 221°±3.6° F. After drying, the samples are cooled at room temperature for fifteen minutes after identifying and weighing to the nearest 0.01 gram. The samples are then immersed in filtered or distilled water for 48 hours in a temperature of 68°±9° F. One sample is removed, surfaces wiped dry and weighed immediately. The process is repeated for each sample.

If the sample absorbs less than 15% water of its dry weight then the sample passes the water absorption test.

2. Description of Background Art

Methods to produce concrete roof tiles are well known. U.S. Pat. No. 4,673,659 teaches a method comprising forming a mix of cement, sand and water, extruding the mix by the well-known roller and slipper method, cutting the extruded mix to provide sections of the required length and curing at elevated temperatures under conditions of high humidity.

Roof tiles of essentially flat or with convoluted constructions are made in this way. Typically, they have densities ranging from 2.1–2.2 g/cc. Typical U.S. interlocking roof tiles have dimensions of about 422 mm (length)×333 mm (width)×11.5 to 12.5 mm (thickness). Such tile usually weighs 4.2 to 5.0 kg/tile, with strengthening ribs, nibs and weatherchecks, which are provided on the undersides of the concrete interlocking roof tiles, add to the overall weight.

Conventional concrete roof tiles of the kind described above provide a satisfactory and highly durable roofing material and are extensively used for the roofing of new houses and other buildings with sufficient supports. However, for re-roofing applications, a frequent problem is that the roofing material to be replaced may be of a lighter weight, such as for example wood shingles and shakes, asphalt shingles, asbestos cement roofing, slates, etc., thereby the building structure concerned may not be able to support the additional load structure resulted from re-roofing with conventional concrete roof tiles. For example, with timber framed buildings, it is often necessary to reinforce the existing roof timbers to ensure that they will bear the additional load. This is costly and time consuming which in practice often leads to abandoning the use of concrete roof tiles for re-roofing work.

Thus, there is continuous need for concrete roof tiles which are lighter in weight than conventional concrete roof tiles but have the adequate strength and durability of conventional concrete roof tiles. Such strong, durable lightweight concrete roof tiles will be useful as a suitable replacement for wood shingles and shakes, asphalt shingles, asbestos cement roofings, slates, etc.

Prior roof tiles and methods of production are disclosed, for example, in Jakel U.S. Pat. No. 3,841,885, Jakel U.S. Pat. No. 3,870,777, Kirkhuff U.S. Pat. No. 3,852,934, Murdock U.S. Pat. No. 4,288,959 and Wood U.S. Pat. No. 4,673,659.

SUMMARY OF THE INVENTION

The present invention provides compositions for the production of fire resistant concrete roof tiles which are substantially lighter in weight than conventional concrete roof tiles, yet have comparable flexural strength and durability.

Specifically, the present invention provides compositions useful for the production of lightweight, fire resistant concrete roof tiles conforming to UBCS No. 32-12.

The present invention further provides a latex/cement/lightweight aggregate/water mix having advantageous rheological properties for extrusion, pressing or casting, to provide lightweight concrete roof tiles of adequate flexural strength.

The present invention is based upon the surprising discovery of incorporating a critical amount of an acrylic latex into a cement/lightweight aggregate/water mix for use in the production of concrete roof tiles. This composition has surprising and superior rheological properties for the purposes of extrusion, pressing or casting to produce excellent lightweight concrete roof tiles of adequate flexural strength.

Specifically, the present invention provides compositions for the production of lightweight fire resistant concrete roof tiles with a butyl acrylate, methylacrylate and methacrylic acid polymer (acrylate) latex, with an acrylate latex solid/cement ratio from 0.1:1 to 0.3:1.

More specifically, the present invention provides compositions useful for fabricating lightweight concrete roof tiles comprising:
(a) 45–65 parts by weight of an acrylic latex emulsion;
(b) 130–180 parts by weight of a cement;
(c) 360–400 parts by weight of a lightweight aggregate; and
(d) 50–75 parts by weight of water.

In addition, the present invention provides improvement in processes to produce lightweight, fire resistant concrete roof tiles of high strength and durability.

Specifically, the present invention provides a lightweight concrete roof tile composition of lightweight aggregates which have been graded and prepared in a very specific manner, and which, when mixed with latex, cement and water in a prescribed sequence will produce a wet mix which can be easily formed using existing extruding, pressing or casting machines designed for standard concrete mixes. The present invention will produce product at very high speed on conventional machines with minor modifications.

Specifically, the present invention provides an improved method for preparing the lightweight concrete roof tiles comprising the steps of:
(a) adding about 37–57 parts of water to 45–65 parts by weight of an acrylic latex emulsion, followed by adding 130–180 parts by weight of a cement in a mixer and operating the mixer to disperse the latex and cement in the water;
(b) then adding 360–400 parts by weight of a lightweight aggregates to the mixer;
(c) then adding the remaining 13–18 parts by weight of water to mixture (b) and operating the mixer to produce a homogeneous mix;
(d) extruding mixture (c) into a roofing tile; and
(e) curing the roofing tile at about 100°–120° F., 80–95% relative humidity for about 2 hours, then for an additional 4 hours with the relative humidity controller turned off.

The present invention provides lightweight roof tile compositions and methods thereof to prepare a lightweight, fire and thermal resistance concrete tiles which can be successfully and easily extruded, pressed or cast into shapes for use in construction. The mix can be extruded, cast or pressed into tiles, shingles, brick, block and panel shapes using a tile extruder or other production machine. The resultant compressed product is homogenous and uniform thus creating superior strength characteristics compared to conventional roof tile mixes. This lightweight concrete roof tile (specific weight is 1.06 to 1.38 or expressed in metric, 1.06 to 1.38 g/cc) absorbs the same amount of water as the conventional rooftile when tested under UBCS No. 32-12.

BRIEF DESCRIPTION OF THE DRAWINGS

The above and other features of the present invention may be more fully understood from the following detailed description taken together with the accompanying drawings, wherein similar characters refer to similar elements throughout and in which.

DESCRIPTION OF THE PREFERRED EMBODIMENT

Figure 2A:
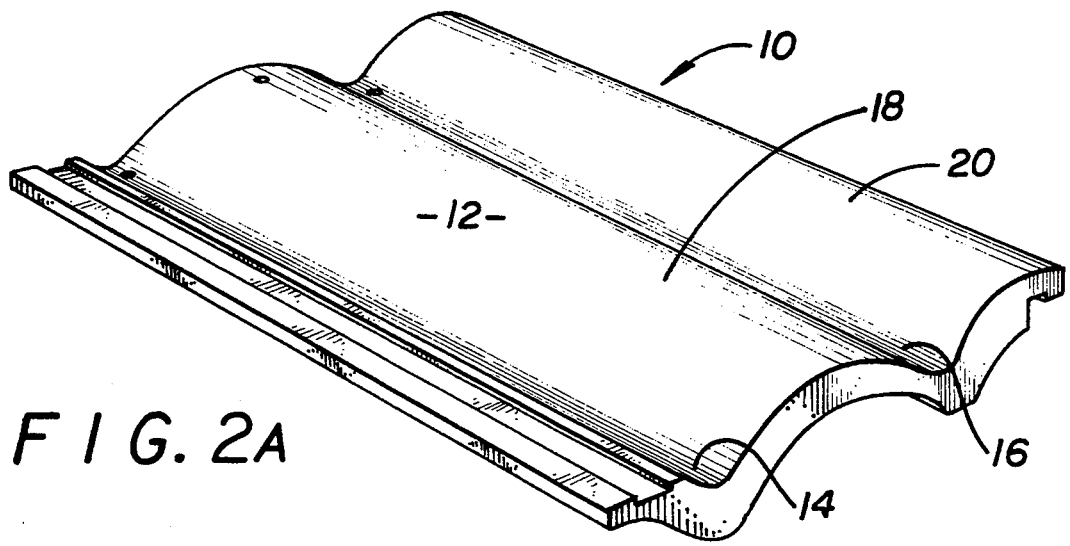
FIG. 2A is a perspective elevational view (looking down at the top surface) of a typical lightweight (about 6 lb/tile) concrete roof tile constructed in accordance with the present invention.
Figure 2B:
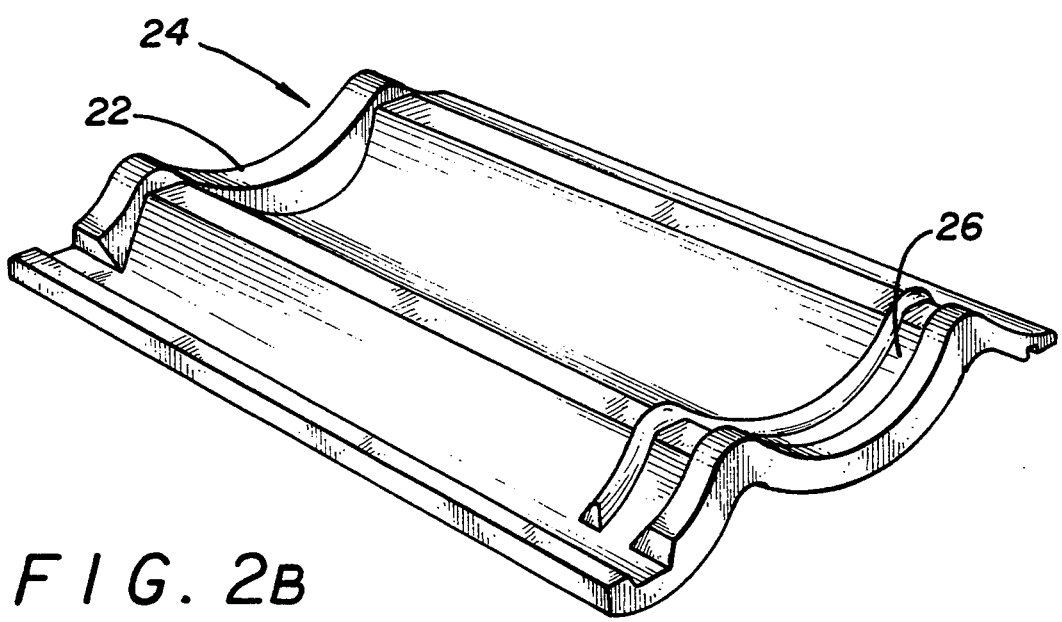
FIG. 2B (similar to FIG. 1A except the tile is inverted and now looking down at the bottom surface of the lightweight tile.

A lightweight concrete roof tile 10 embodying the characteristics of the present invention is shown in FIGS. 2A–2B. Referring to FIG. 2A, the tile 10 has a top surface 12, with low vertical planes 14 and 16, and high vertical planes 18 and 20. FIG. 2B shows a continuous anchor lug 22 extending across the full width of the underside of each tile at the head end 24. A weather ban 26 is also shown at the underside of the tile.

In the present invention, it has been found that critical sequence of mixing and a critical combination of compositions is required to fabricate concrete lightweight roof tiles that meet UBCS No. 32-12.

Generally, a latex is a dispersion of finely divided particles of polymer in water. Macroscopically, latexes look like white milky substances and they are very sticky. Microscopically, latexes are composed of spherical polymer particles suspended in water. A standard latex of 50 weight percent polymer solids with an average particle size of 2000 Å contains about 10,000,000,000,000 particles/cc.

It has been found that surprisingly, a specific latex with a specific latex/cement/lightweight aggregate/water ratio provides a very substantial improvement in the performance, particularly the flexural strength of the lightweight concrete roof tile obtained.

The latex used in the present composition is preferably of an acrylic type. Acrylic latex of the butyl acrylate, methylacrylate, methacrylic acid polymer is particularly preferred and one such latex is available as UCAR Latex 429 from Union Carbide Corp., Cary, N.C. U.S.A. The UCAR Latex 429 has a 45–47% of solid polymer by weight, with a pH of 9–10, a viscosity of 30–300 cps, a minimum filming temperature of 10° C., weighs 4 kgs/gallon, and a particle size of 0.2μ. Chemically, it has a structure of:

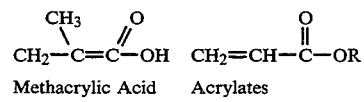

Methacrylic Acid    Acrylates

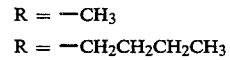

The particular latex emulsion used may contain a wide variety of minor materials, such as preservatives, antioxidants, stabilizers, anti-foaming agents, dispersing agents, thickeners, accelerators and fillers. These are conventional ingredients added in small amounts to commercial lattices. Their presence or absence does not ordinarily affect the process of this invention nor the products produced thereby. They ordinarily function solely to maintain the desirable properties of the latex prior to the latter's incorporation into the products of this invention.

The solid latex will be present in a concentration of from about 3 to 5.5 weight percent preferably 4–5.0 weight percent, most preferably about 4.4 weight %. Since water comprises about 53–55% of the latex emulsion, the actual amount of emulsion will be about 2.2 times the above concentrations.

The lightweight aggregates used in accordance with the invention include naturally occurring materials such as pumice and scoria and materials produced by manufacturing processes such as sintered pulverized fuel ash and expanded materials such as expanded shale, clay, slate, vermiculite and perlite and various blends thereof.

The preferred expanded shale material used in accordance with the present invention has a particle size of less than 4.75 mm, and advantageously has a particle size distribution finer than that of the sand used in conventional mixes for the production of concrete roof tiles by extrusion. Expanded shale aggregate meeting these requirements can be produced by an extrusion and chopping method. Fine expanded shale material having a particle size of less than about 3.35 mm is particularly preferred and one such material having a suitable particle size distribution is that available as RIDGELITE ® No. 3 FINE SAND from Lightweight Processing Co. of Glendale, Calif. U.S.A. This material has a specific weight of 0.80–0.90 weighing 40–60 lbs/ft$^3$.

The expanded shale is screened to create a material having the following sieve analysis expressed in percent passing by weight:

| Aggregate size | No. 3 Sand |
| --- | --- |
| Sieve Size | Sieve analysis (percent passing by weight) |
| ¼ Inch | 0 |
| No. 4 | 100 |
| No. 8 | 99 |
| No. 16 | 70 |
| No. 30 | 48 |
| No. 50 | 28 |
| No. 100 | 17 |
| No. 200 | 10 |
| Dry specific gravity | 141 |

Other lightweight aggregate materials may be used instead of the expanded shale, dependent however upon the availability of appropriate grades of such materials. One such materials is UTELITE ®, supplied by the UTE-LITE Corporation of Utah and is an expanded shale, comprising shale, quartz and amorphous silicon in excess of 1%. Preferably, the fine fines of UTELITE ® be used in the present invention.

As the cement to be used in accordance with the invention, Portland cement, especially Type I and Type II Portland cements, can be used. Especially preferred are Portland cements meeting the requirement for Type I Portland Cement, ASTM designation C-150. In addition to Portland cement, other known cements can be used. For example, aluminous cement, natural cement, oxychloride cement, magnesia cement and gypsum cements can be used as long as they give the desirable specific gravity of the lightweight rooftile produced.

The compositions useful for fabricating lightweight concrete roof tiles comprises:
(a) 45–65 parts by weight of an acrylic latex emulsion;
(b) 130–180 parts by weight of a cement;
(c) 360–400 parts by weight of a lightweight aggregates; and
(d) 50–75 parts by weight of additional water.

Preferably, the compositions useful for fabricating lightweight concrete roof tiles comprises:
(a) 50–60 parts by weight of an acrylic latex emulsion;
(b) 150–170 parts by weight of a cement;
(c) 370–390 parts by weight of a lightweight aggregate; and
(d) 60–70 parts by weight of additional water.

Most preferably, the compositions useful for fabricating lightweight concrete rooftiles comprises:
(a) 55 parts by weight of an acrylic latex emulsion;
(b) 160 parts by weight of a cement;
(c) 380 parts by weight of a lightweight aggregate; and
(d) 65 parts by weight of additional water.

It has been possible using a method according to the invention to produce concrete roof tiles having density of from about 1.06 to about 1.38 g/cc, for example, about 1.27 to about 1.3 g/cc, and having a weight per tile as low as about 2.6 kg, that is about 55% of the weight of conventional concrete roof tiles but with comparable flexural strength. The tiles in accordance with the present invention preferably have a minimum thickness of from about 9 to about 12 mm, particularly about 10 to about 11 mm.

Another advantage of the present method is that it can be conveniently carried out using conventional equipment and conditions as employed in the well known roller and slipper method.

It is critical that the latex/cement/lightweight aggregates/water be mixed in a prescribed sequence, so that existing extruding, pressing or casting machines designed for standard concrete mixes can be used to produce the lightweight concrete roof tiles of the required strength.

An improved method for preparing the lightweight roof tile of the composition of the present invention comprises the steps of:
(a) adding about 37–57 parts of water to 45–65 parts by weight of an acrylic latex emulsion, followed by adding 130–180 parts by weight of a cement in a mixer and operating the mixer to disperse the latex and cement in the water;
(b) then adding 360–400 parts by weight of a lightweight aggregate to the mixer;
(c) then adding the remaining 13–18 parts by weight of water to mixture (c) and operating the mixer to produce a homogeneous mix;
(d) extruding mixture (d) into a roofing tile; and
(e) curing the roofing tile at about 100°–120° F., 80–95% relative humidity for about 2 hours, then at 100°–120° F. for an additional 4 hours with the relative humidity controller turned off.

Other common additives for concrete and lightweight cement products may be added at the appropriate places depending on the end use. For example, accelerators, such as calcium chloride can be utilized.

The lightweight rooftile composition also may include, in particular applications, foaming agents or defoaming agents which comprises various anionic, cationic, nonionic and other surface active compounds. The amount of such surface active agents added to the rooftile composition will typically be in the range of from about 0.1 to about 3 percent by weight of cement. Generally, the selection of such additives will be within the skill of those knowledgeable in cement and rooftile technology.

In addition, to produce a colored rooftile, pigments may be included. Exemplary organic pigments include Benzidine yellow, Lithol Red 4R, Peacock Blue Lake, Aniline Black, PV Violet BL, etc. Exemplary inorganic pigments include titanium oxide, zinc white, red iron oxide, cadmium yellow, cadmium red, prussian blue, carbon black, etc.

One of the principle method for forming the lightweight concrete roof tile is by extrusion. In extrusion method, the forming pressure is about 200 lbs/in². The typical extrusion method as used here to produce lightweight concrete roof tiles is on a carrier pallet which creates the shape of the bottom of the tile and a roller and slipper shape the top surface. Curing proceeds on the pallet or pallets, about which shingles are removed. The top surface of the tile which is shaped by the roller and slipper on the extrusion machine can be modified to produce any shape from a smooth European tile to a rough random shape of a cedar shape. The bottom surface is shaped by the pallet, and may be hollowed out.

Additionally, a shake shingle shape can be extruded using the same extrusion method.

Additionally, the shingle underside may be hollowed out in the same manner as with the concrete tile to further reduce the installed weight.

The second method of forming and shaping employs a standard power or block forming machine. This machine handles the lightweight concrete roof tile composition easily and consistently without modification. Thus, products previously produced using standard heavy concrete mixers can, by using the present mix, be also produced in a lightweight version. The shapes for roof tiles and shake shingles may also be produced on these machines.

The following non-limiting examples further illustrate the present invention.

EXAMPLE 1

Lightweight concrete roof tiles were prepared using the improved method by extrusion from the composition indicated in Table 1 below.

TABLE 1

| Ingredients | Lightweight Roof Tile Composition | | |
|---|---|---|---|
| | Parts by weight (kg) | Abs. Vol. (1) | % of Design |
| Water | 21.8 | 21.8 | 8 |
| UCAR Latex 429/6583 | 23.6 | 22.9 | 8 |
| Cement (Portland Type I & II) | 68.2 | 21.8 | 25 |
| Lightweight Aggregate (RIDGELITE ® LITEWEIGHT SAND #3) | 163.6 | 127.4 | 59 |
| Total: | 277.2 | 193.9 | 100% |

Figure 1:
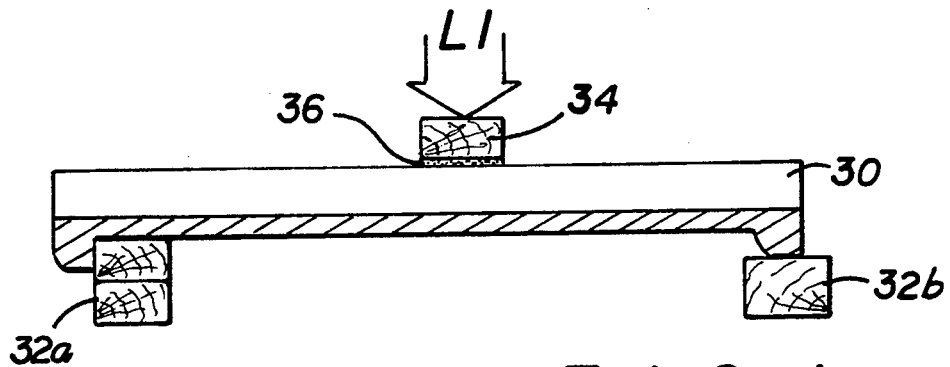
FIG. 1 shows the "strength-test" setup for the concrete lightweight roof tiles.

After curing, the tiles prepared from composition 1 was subjected to the strength and water absorption test under UBCS No. 32-12. For the strength test, referring to FIG. 1, a sample 30 is supported by supporting battens 32a and 32b at a span of 14 inches centered on the length of the sample. The 14 inch test span is the maximum unsupported span specified for field installation of the lightweight rooftile. The load L1 is applied with a 2-by-4-inch (nominal size) wood piece 34 laid flat and continuous from edge to edge of the tile. The load L1 is being applied at a uniform rate not exceeding ten pounds per second until failure. A felt 36 may be used between the sample and the wood piece 34 to provide a better contact. The results are as follows:

| Number Of Samples | ½ Tile Oven Dry Weight (gms) | 48 Hours Wt (gms) | 48 Hours Water Absorp. | Flexural Strenth Load (Pounds) |
|---|---|---|---|---|
| 1 | 1327 | 1428 | 7.6 | 438 |
| 2 | 1310 | 1401 | 6.9 | 460 |
| 3 | 1326 | 1449 | 9.3 | 432 |
| 4 | 1301 | 1421 | 9.2 | 394 |
| 5 | 1279 | 1395 | 9.1 | 412 |
| Average | 1308.6 | 1418.8 | 8.4 | 427 |

EXAMPLE 2

Lightweight concrete roof tiles were prepared using the improved method by extrusion from the composition indicated in Table 2 below.

TABLE 2

| Ingredients | Lightweight Concrete Roof Tile Composition | | |
|---|---|---|---|
| | Parts by weight (kg) | Abs. Vol. (1) | % of Design |
| Water | 26.8 | 26.9 | 10 |
| UCAR Latex 429/6583 | 18.6 | 18.1 | 7 |
| Cement (Portland Type I & 11) | 54.5 | 17.3 | 20 |
| Lightweight Aggregate (RIDGELITE ® LITEWEIGHT SAND #3) | 169 | 131 | 63 |
| Total: | 269 | 193.3 | 100% |

After curing, the tiles prepared from composition 2 was subjected to the strength and water absorption test under UBCS No. 32-12 as in Example 1.

What is claimed is:

1. A composition useful for fabricating lightweight concrete roof tiles consisting essentially of:
   (a) 45-65 parts by weight of an acrylic latex emulsion;
   (b) 130-180 parts by weight of a cement;
   (c) 360-400 parts by weight of a lightweight aggregate; and
   (d) 50-75 parts by weight of water.

2. A composition as set forth in claim 1 wherein said acrylic latex is a butyl acrylate, methacrylate and methylacrylic acid polymer latex.

3. A composition as set forth in claim 2 wherein said acrylic latex emulsion consists essentially of 45-47% of solid polymer by weight.

4. A composition as set forth in claim 2 wherein said acrylic latex emulsion is present in an amount of about 50-60 parts by weight.

5. A composition as set forth in claim 2 wherein said acrylic latex emulsion is present in an amount of 55 parts by weight.

6. A composition as set forth in claim 1 wherein said cement is a Type I Portland cement.

7. A composition as set forth in claim 6 wherein said cement is present in an amount of 150–170 parts by weight.

8. A composition as set forth in claim 6 wherein said cement is present in an amount of 20 parts by weight.

9. A composition as set forth in claim 1 wherein said lightweight aggregate is an expanded shale lightweight aggregate.

10. A composition as set forth in claim 9 wherein said lightweight aggregate is present in an amount of 370–390 parts by weight.

11. A composition as set forth in claim 9 wherein said lightweight aggregate is present in an amount of 380 parts by weight.

12. A composition as set forth in claim 1 wherein said water is present in an amount of 65 parts by weight.

13. A composition useful for fabricating lightweight concrete roof tiles consisting essentially of:
(a) 55 parts by weight of a butyl acrylate, methacrylate and methylacrylic acid polymer latex emulsion; wherein said polymer latex emulsion consists essentially of 45–47% of solid polymer by weight;
(b) 20 parts by weight of a Type I Portland cement;
(c) 380 parts by weight of an expanded shale lightweight aggregate; and
(d) 65 parts by weight of water.

* * * * *

UNITED STATES PATENT AND TRADEMARK OFFICE
CERTIFICATE OF CORRECTION

PATENT NO. : 5,395,442
DATED : March 7, 1995
INVENTOR(S) : Harvey R. Dunton, et. al.

It is certified that error appears in the above-indentified patent and that said Letters Patent is hereby corrected as shown below:

Column 4, line 1, after "FIG. 2B" delete "(similar" and insert --is similar --,--.

Signed and Sealed this

Ninth Day of May, 1995

BRUCE LEHMAN

Attest:

Attesting Officer

Commissioner of Patents and Trademarks